(12) United States Patent
Kuriyama (10) Patent No.: US 11,298,617 B2
(45) Date of Patent: Apr. 12, 2022

(54) GAME PROGRAM, GAME PROCESSING METHOD, AND INFORMATION PROCESSING DEVICE

(71) Applicant: KOEI TECMO GAMES CO., LTD., Kanagawa (JP)

(72) Inventor: Masayuki Kuriyama, Kanagawa (JP)

(73) Assignee: KOEI TECMO GAMES CO., LTD., Kanagawa (JP)

( * ) Notice: Subject to any disclaimer, the term of this patent is extended or adjusted under 35 U.S.C. 154(b) by 0 days.

(21) Appl. No.: 17/097,302

(22) Filed: Nov. 13, 2020

(65) Prior Publication Data

US 2021/0154578 A1 May 27, 2021

(30) Foreign Application Priority Data

Nov. 21, 2019 (JP) .............................. JP2019-210399

(51) Int. Cl.
*A63F 13/5258* (2014.01)
*G06T 7/13* (2017.01)
(Continued)

(52) U.S. Cl.
CPC .......... *A63F 13/5258* (2014.09); *A63F 13/45* (2014.09); *A63F 13/5252* (2014.09); *G06T 7/13* (2017.01)

(58) Field of Classification Search
CPC ................ A63F 13/525; A63F 13/5258; A63F 2300/6661; A63F 2300/6684
See application file for complete search history.

(56) References Cited

U.S. PATENT DOCUMENTS 5,566,280 A * 10/1996 Fukui ...................... G06T 15/10
345/419
2001/0021665 A1* 9/2001 Gouji ..................... A63F 13/818
463/7
(Continued)

FOREIGN PATENT DOCUMENTS

JP          11235466 A  *  8/1999
JP          2000-202162     7/2000
(Continued)

OTHER PUBLICATIONS

English machine translation of JP 2000-0202162A. Source:https://patents.google.com/patent/JP2000202162A/en?oq=JP2000202162A (Year: 2000).*
(Continued)

*Primary Examiner* — Steven J Hylinski
(74) *Attorney, Agent, or Firm* — IPUSA, PLLC (57) ABSTRACT

A non-transitory computer-readable recording medium having computer-readable instructions stored thereon, which when executed, causes a computer to execute a process of a game program, is provided. The process includes a step (a) of setting a default position of a virtual camera; a step (b) of calculating an outer edge of multiple objects arranged in a given region in the virtual space; a step (c) of determining a target position in an interior of the outer edge, to which the virtual camera is directed; a step (d) of adjusting a height of the virtual camera at the default position so as to display all of the plurality of objects in the region when the virtual camera is directed from the default position to the target position; and a step (e) of operating the virtual camera to be directed to the target position from the adjusted height of the default position.

9 Claims, 11 Drawing Sheets

(51) Int. Cl.
*A63F 13/45* (2014.01)
*A63F 13/5252* (2014.01)

(56) References Cited

U.S. PATENT DOCUMENTS

| | | | | |
|---|---|---|---|---|
| 2003/0032477 | A1* | 2/2003 | Aoki | A63F 13/525 |
| | | | | 463/30 |
| 2005/0187015 | A1* | 8/2005 | Suzuki | A63F 13/26 |
| | | | | 463/32 |
| 2005/0266921 | A1* | 12/2005 | Hayashida | G06T 15/20 |
| | | | | 463/33 |
| 2006/0250398 | A1* | 11/2006 | Akada | A63F 13/5258 |
| | | | | 345/427 |
| 2007/0298881 | A1* | 12/2007 | Kawamura | A63F 13/10 |
| | | | | 463/33 |
| 2009/0244064 | A1* | 10/2009 | Inokuchi | G09B 5/02 |
| | | | | 345/420 |
| 2010/0069152 | A1 | 3/2010 | Nishimura et al. | |
| 2012/0308078 | A1* | 12/2012 | Fujibayashi | A63F 13/04 |
| | | | | 382/103 |
| 2018/0068488 | A1 | 3/2018 | Hart et al. | |
| 2018/0326302 | A1* | 11/2018 | Tsutsui | A63F 13/837 |
| 2020/0188787 | A1* | 6/2020 | Downing | A63F 13/812 |

FOREIGN PATENT DOCUMENTS

| | | |
|---|---|---|
| JP | 2002-163676 | 6/2002 |
| JP | 2010-068882 | 4/2010 |
| JP | 2017-228308 | 12/2017 |
| WO | 2016157247 | 10/2016 |

OTHER PUBLICATIONS

Notice of Reasons for Refusal (English Translation) for JP2019-210399. dated Feb. 9, 2021 (Year: 2021).*
Office Action dated Feb. 9, 2021 (Japanese Patent Application No. 2019-210399).

* cited by examiner

| DEFAULT POSITION OF VIRTUAL CAMERA | COORDINATES (x, y, z) |
|---|---|
| 1 | $(x_1, y_1, z_1)$ |
| 2 | $(x_1, y_2, z_1)$ |
| 3 | $(x_2, y_2, z_1)$ |
| 4 | $(x_2, y_1, z_1)$ |
| 5 | $(x_3, y_3, z_1)$ |
| 6 | $(x_4, y_4, z_1)$ |

FIG.6

| AREA | OBJECT |
|---|---|
| $(x_1, y_1, z_1) - (x_2, y_2, z_1)$ | C1 |
| | C2 |
| | C3 |
| | C4 |
| | C5 |
| | C6 |

GAME PROGRAM, GAME PROCESSING METHOD, AND INFORMATION PROCESSING DEVICE

CROSS-REFERENCE TO RELATED APPLICATIONS

The present application claims priority under 35 U.S.C. § 119 to Japanese Patent Application No. 2019-210399 filed on Nov. 21, 2019, the entire contents of which are hereby incorporated by reference.

BACKGROUND OF THE INVENTION

1. Field of the Invention

The present disclosure relates to a medium of a game program, a game processing method, and an information processing device.

2. Description of the Related Art

A method of imaging by a virtual camera to improve the visibility of an image for a user in a game or the like, has been proposed. For example, Patent document 1 proposes to appropriately control a virtual camera in a shooting game in which a player character and multiple non-player characters are arranged and an image captured with a virtual camera is used as the game screen, so as to capture images that constitute the game screen on which it is easier to play the game even when a large number of non-player characters are appearing one after another. Patent document 2 proposes to determine the position of a virtual camera so as to include a player object and an enemy object present in a circle area around the player object in the field of view.

RELATED ART DOCUMENTS

Patent Documents

Patent document 1: Japanese Laid-Open Patent Application No. 2010-68882
Patent document 2: Japanese Laid-Open Patent Application No. 2017-228308

However, in such a game system, an image to be captured by the virtual camera is adjusted mainly from a viewpoint centered around the player character, such as from a first-person viewpoint at which the player character views the scene, or from a slightly backward place from the viewpoint of the player character to watch the surroundings. Therefore, it is difficult to see moves of enemy characters and other objects outside the surroundings of the player character, and difficult to grasp the entire movement in the game.

SUMMARY OF THE INVENTION

According to one aspect of the present disclosure, a non-transitory computer-readable recording medium having computer-readable instructions stored thereon, which when executed, causes a computer to execute a process of a game program, is provided. The process includes a step (a) of setting a default position of a virtual camera; a step (b) of calculating an outer edge of multiple objects arranged in a given region in the virtual space; a step (c) of determining a target position in an interior of the outer edge, to which the virtual camera is directed; a step (d) of adjusting a height of the virtual camera at the default position so as to display all of the plurality of objects in the region when the virtual camera is directed from the default position to the target position; and a step (e) of operating the virtual camera to be directed to the target position from the adjusted height of the default position.

The object and advantages of the embodiment will be realized and attained by means of the elements and combinations particularly pointed out in the claims. It is to be understood that both the foregoing general description and the following detailed description are exemplary and explanatory and are not restrictive of the present inventive concept as claimed.

DETAILED DESCRIPTION OF THE EMBODIMENTS

In the following, embodiments for carrying out the present disclosure will be described. Note that in the specification and the drawings, the same reference symbols are assigned to substantially the same elements, to omit duplicate descriptions.

According to the present disclosure, it is possible to provide a medium of a game program, a game processing method, and an information processing device that are capable of looking over and displaying a game.

Game System

Figure 1:
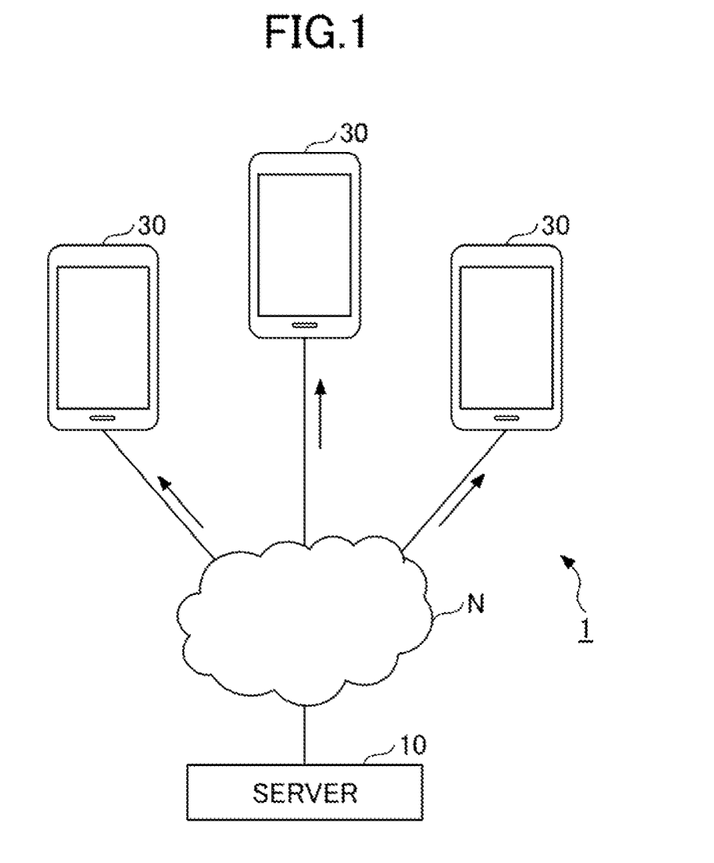
FIG. 1 is a diagram illustrating a game system according to an embodiment.

FIG. 1 is a diagram illustrating a configuration of a game system 1 according to the embodiment. The game system 1 of the embodiment provides various services related to games to players via a network N (e.g., the Internet). The game system 1 includes a server 10 and multiple terminal devices 30. The server 10 is an example of an information processing device that provides various game-related services to multiple terminal devices 30. The server 10 may be a personal computer, a workstation, a cloud computer, or the like.

The terminal device 30 is an example of an information processing device used by a player when playing a game. The terminal device 30 may be a smartphone, a personal computer, a portable game device, a game controller, a tablet computer, a wearable computer, or a game device for business use.

The terminal device 30 requests the server 10 to distribute various items of information related to games (game programs, game screens, etc.). In response to receiving a request for distribution of various items of information from the terminal device 30, the server 10 distributes a game program or a web page of a game screen to be played on the terminal device 30.

The terminal device 30 has a function of a web browser that allows a player to browse a web page displaying a game screen. By this function, the terminal device 30 can display a web page such as a game screen distributed from the server 10.

Note that the number of terminal devices 30 connected to the game system 1 is not limited to three, and may be one, or greater than or equal to two. Multiple servers may interoperate with each other to implement the functions of the server 10. The server 10 may provide an on-line game in which multiple terminal devices 30 connected to the network N are divided into friends and enemies to fight against each other. However, the server 10 is not limited as such, and can provide all types of games including sports games such as basketball and tennis games, racing games, town planning games, and the like. The server 10 can provide a function by which a user other than the player can watch these games. The terminal devices 30 may include a terminal device 30 on which a player is playing a game, and a terminal device 30 on which a user other than the player is watching the game. On the latter terminal device 30, the user can watch the circumstances of a battle game, a match of a sports game, and the like. In particular, the server 10 operates a virtual camera so that it is possible to look over and display the entire game; therefore, the user can watch the game dynamically and grasp the entire game easily.

Hardware Configuration of Server 10

Figure 2:
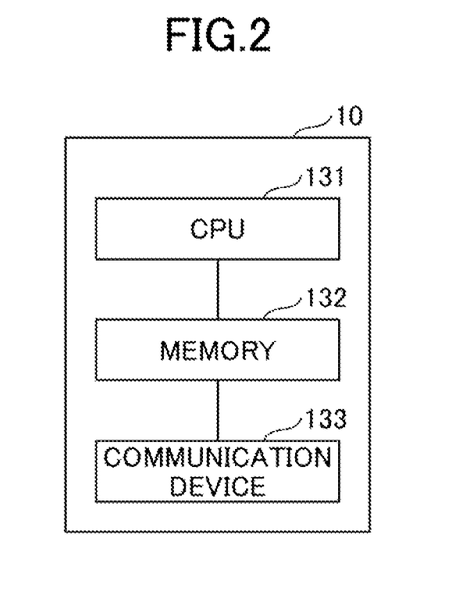
FIG. 2 is a diagram illustrating a hardware configuration of a server according to the embodiment.

Next, the hardware configuration of the server 10 will be described with reference to FIG. 2. FIG. 2 is a diagram illustrating the hardware configuration of the server 10 according to the embodiment. The server 10 includes a CPU (Central Processing Unit) 131, a memory 132, and a communication device 133. The CPU 131 controls the server 10. The memory 132 is, for example, a storage device such as a memory in the server 10, which is directly accessible by the CPU 131. The communication device 133 is a communication device such as a network card to control communication.

In the server 10, various types of microprocessors such as a GPU (Graphics Processing Unit) and a DSP (Digital Signal Processor), and various types of memories such as a VRAM, a RAM, and a ROM may be installed.

The server 10 includes game management functions of providing to the terminal device 30 various game data items necessary for playing a game using the terminal device 30 through arithmetic processing, and of controlling and managing execution of game processing executed on the terminal device 30. The server 10 causes the CPU 131 to execute arithmetic processing based on predetermined programs and data, to execute game processing of a battle game and operations of the virtual camera. Note that the processing implemented on the server 10 are not limited to these, and may be added or omitted as appropriate.

Hardware Configuration of Terminal Device 30

Figure 3:
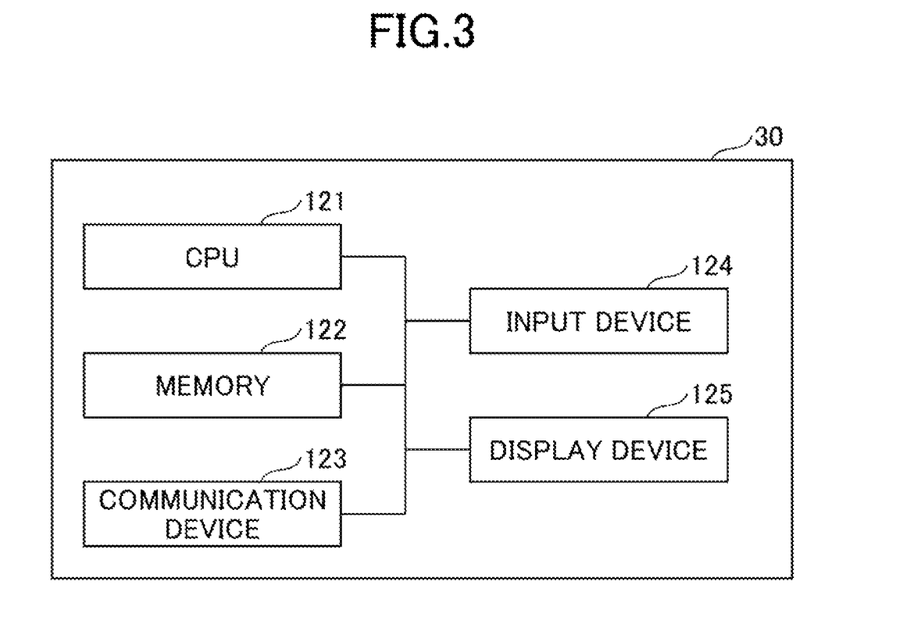
FIG. 3 is a diagram illustrating a hardware configuration of a terminal device according to the embodiment.

Next, the hardware configuration of the terminal device 30 will be described with reference to FIG. 3. FIG. 3 is a diagram illustrating a hardware configuration of the terminal device 30 according to the embodiment. The terminal device 30 includes a CPU 121, a memory 122, a communication device 123, an input device 124, and a display device 125. The CPU 121 controls the terminal device 30. The memory 122 is, for example, a storage medium such as a memory in the terminal device 30, which is directly accessible by the CPU 121. The communication device 123 is a communication device such as a network circuit to control communication. The input device 124 is an input device such as a camera or a touch panel. The display device 125 is an output device such as a display.

The terminal device 30 executes a game provided from the server 10. In one example of the embodiment, the player uses the terminal device 30 to play a battle game provided from the server 10, in which three to three characters as friends and enemies fight against each other on a stage formed like a miniature garden. At this time, the server 10 provides a mechanism for operating a virtual camera so as to display all characters on the stage automatically. However, the game played by the player is not limited to a battle game, and any game such as a role-playing game (RPG) may be played.

Functional Configuration of Server 10

Figure 4:
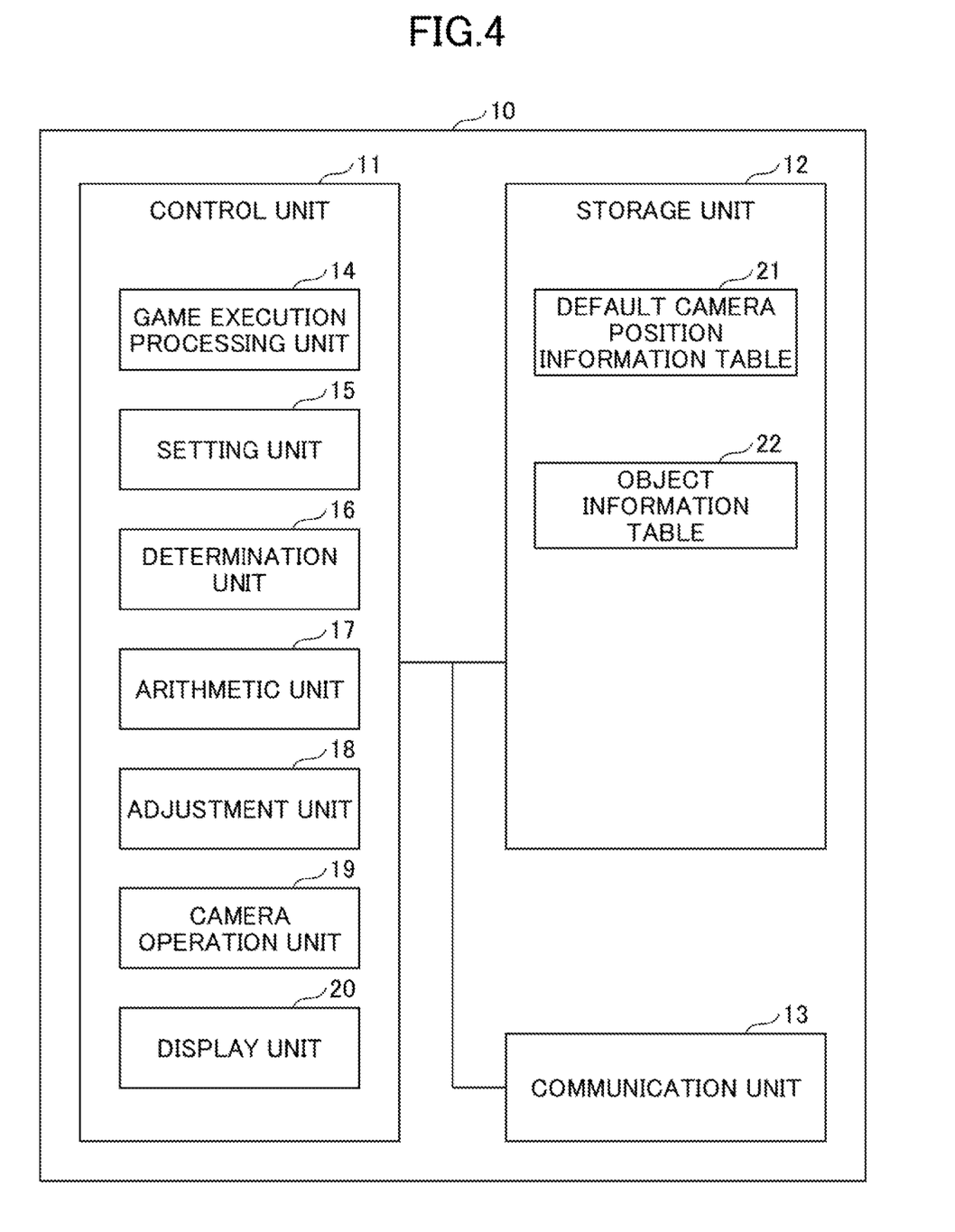
FIG. 4 is a diagram illustrating a functional configuration of a server according to the embodiment.

Next, the functional configuration of the server 10 will be described with reference to FIG. 4. FIG. 4 is a diagram illustrating the functional configuration of the server 10 according to the embodiment. The server 10 includes a control unit 11, a storage unit 12, and a communication unit 13.

The control unit 11 transmits and receives data between the units, and controls the entire server 10. The control unit 11 is implemented by the CPU 131 executing a program stored in a predetermined area in the memory 132.

The storage unit 12 stores game programs, various types of data items, and various types of tables for executing battle games and watching processes. The storage unit 12 is implemented by, for example, the memory 132. The storage unit 12 includes a ROM (read-only memory) that is read-only to store game programs, and a RAM (random access memory) that is rewritable to be used as a work area for calculation processes by the control unit 11. The storage unit 12 may also be implemented by a non-volatile storage device, for example, a flash memory, a hard disk, or the like.

The communication unit 13 includes a function of communicating with the terminal device 30 and the other devices. The communication unit 13 includes a function as a receiver for receiving various items of data transmitted from the terminal device 30, and a function as a transmitter for transmitting various items of data to the terminal device 30 in response to a command from the control unit 11. The communication unit 13 is implemented by, for example, a NIC (Network Interface Card).

The control unit 11 includes a game execution processing unit 14, a setting unit 15, a determination unit 16, an arithmetic unit 17, an adjustment unit 18, a camera operation unit 19, and a display unit 20. The game execution processing unit 14 includes a function of executing processes related to battle games. In one example of the embodiment, the game execution processing unit 14 executes a process of determining win or lose for a three-to-three battle (fight) between friend characters including a player character and enemy characters.

The setting unit 15 includes a function of setting a default position of the virtual camera. The setting unit 15 can set multiple default positions. The virtual camera is placed at one of the default positions. In one example of the embodiment, the setting unit 15 sets four corners of a stage as the default positions of the virtual camera, and further sets two positions inside the stage as the default positions. The virtual camera captures images of an ongoing game on the stage in a virtual space from the default position. The virtual camera can be moved from one default position among the multiple default positions to another.

The determination unit 16 includes a function of calculating an outer edge of multiple objects arranged in a given region in the virtual space. The given region may be the entirety or part of a field where the game is played. In an example of the embodiment, the given region may be the entirety or part of a stage where the game is played. The given region may be a region among partitioned regions of the field where the game is played that satisfies a desired condition.

The arithmetic unit 17 includes a function of calculating the distance between two characters. In a three-to-three battle game of a miniature garden type provided from the server 10, three friend characters and three enemy characters are displayed on the stage. In one example of the embodiment, the arithmetic unit 17 calculates the distances between every pair among the six characters, to calculate the distance between the farthest characters. The arithmetic unit 17 repeatedly executes this calculation at predetermined time intervals, to calculate the distance between the farthest characters at that time, depending on moves of the respective characters. Note that although the arithmetic unit 17 executes the calculation for the six characters, the number of characters subject to the calculation is not limited to six. Also, the objects subject to the calculation is not limited to characters, and the object may be a building, a tree, and the like.

The determination unit 16 determines a target position to which the virtual camera is directed, based on the distance between the farthest characters calculated by the arithmetic unit 17.

The adjustment unit 18 includes a function of adjusting the height of the virtual camera at a default position, so as to display all characters on the stage when the virtual camera is directed to the target position from the default position.

The camera operation unit 19 includes a function of operating the virtual camera to be directed to the target position from the adjusted height of the default position. The camera operation unit 19 may change the position where the virtual camera is placed from one default position to another default position while directing the virtual camera to follow the changing target position.

The display unit 20 controls a web page of a game screen of images presenting the circumstances of a game on the stage captured by the virtual camera. The web page of the game screen controlled by the display control unit 20 is transmitted to the terminal device 30 through the communication unit 13, to be displayed on the display unit 35 of the terminal device 30.

The storage unit 12 stores a camera default position information table 21 and an object information table 22.

Camera Default Position Information Table

Figure 5:
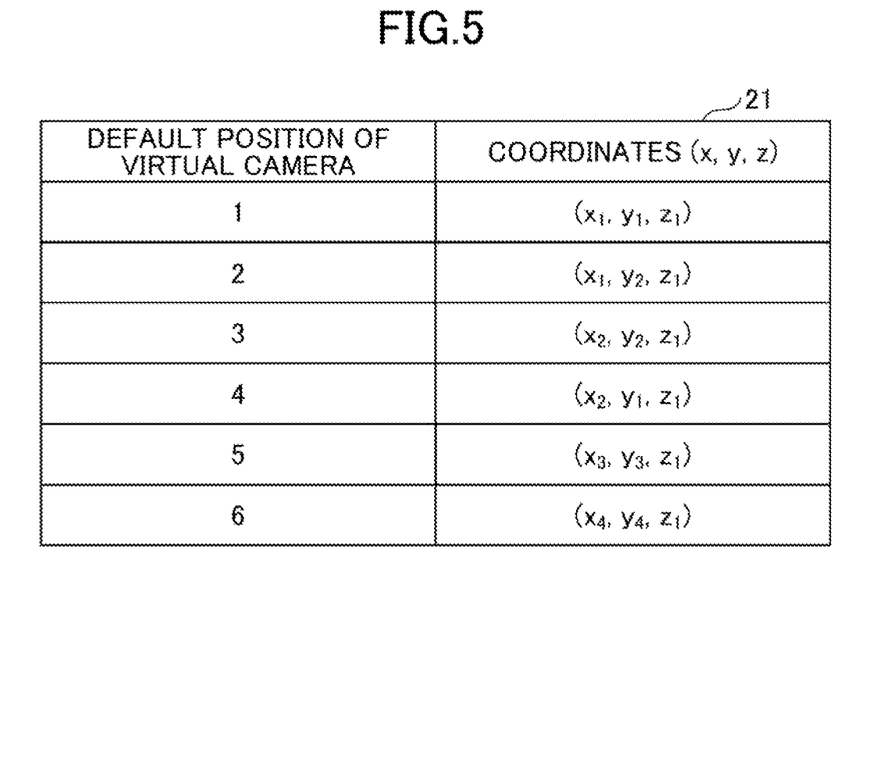
FIG. 5 is a diagram illustrating an example of a camera default position information table according to the embodiment.

The camera default position information table 21 stores the default positions to place the virtual camera. FIG. 5 is a diagram illustrating an example of the camera default position information table 21 according to the embodiment. In the camera default position information table 21, sequential numbers are assigned to the default positions of the virtual camera, and the coordinates (x, y, z) are specified for each default position having the corresponding number. In the example in FIG. 5, there are six default positions numbered 1 to 6 for the virtual camera, and each default position is specified by the coordinates (see the positions 1 to 6 in FIGS. 9A-9B). The x and y coordinates are coordinates on the stage in the horizontal direction, and the z coordinate is a coordinate on the stage in the vertical direction. In the camera default position information table 21, the initial value of the z coordinate of each default position is set to z1, and the height is the same for all the default positions in the initial state. However, in the camera default position information table 21, the initial values of the z coordinate of the default positions may be set to different heights.

Object Information Table

Figure 6:
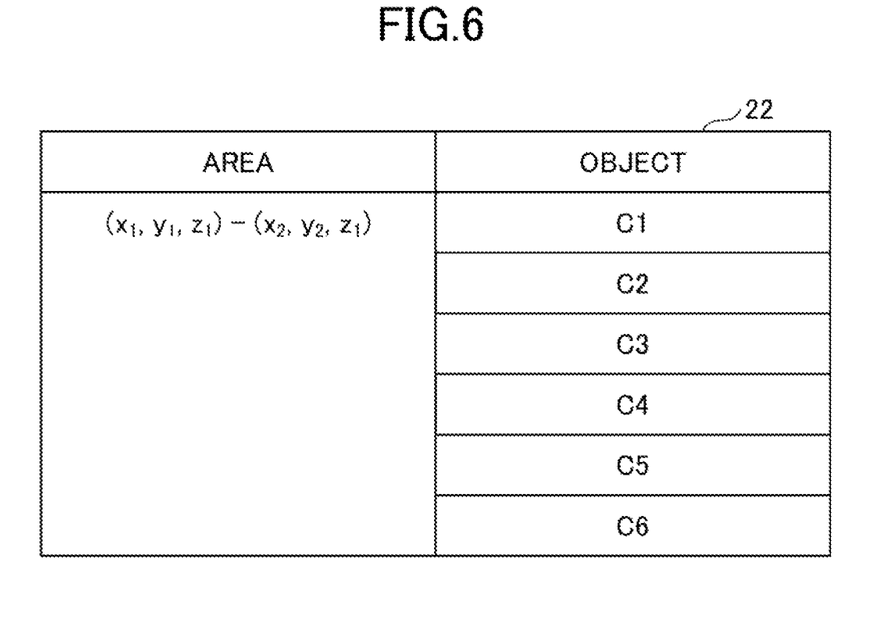
FIG. 6 is a diagram illustrating an example of an object information table according to the embodiment.

The object information table 22 stores a given region to serve as an imaging region in the virtual space, and an object to be imaged. FIG. 6 is a diagram illustrating an example of the object information table 22 according to the embodiment. In the example in FIG. 6, in the object information table 22, the region is set to a region determined by coordinates (x1, y1, z1) of the upper left default position 1 and the coordinates (x2, y2, z1) of the lower right default position 3, and characters C1 to C6 are stored as the objects in the region. Note that as the region stored in the object information table 22, the entirety or part of the field may be set. Also, objects in the region may be other than characters.

Functional Configuration of Terminal Device 30

Figure 7:
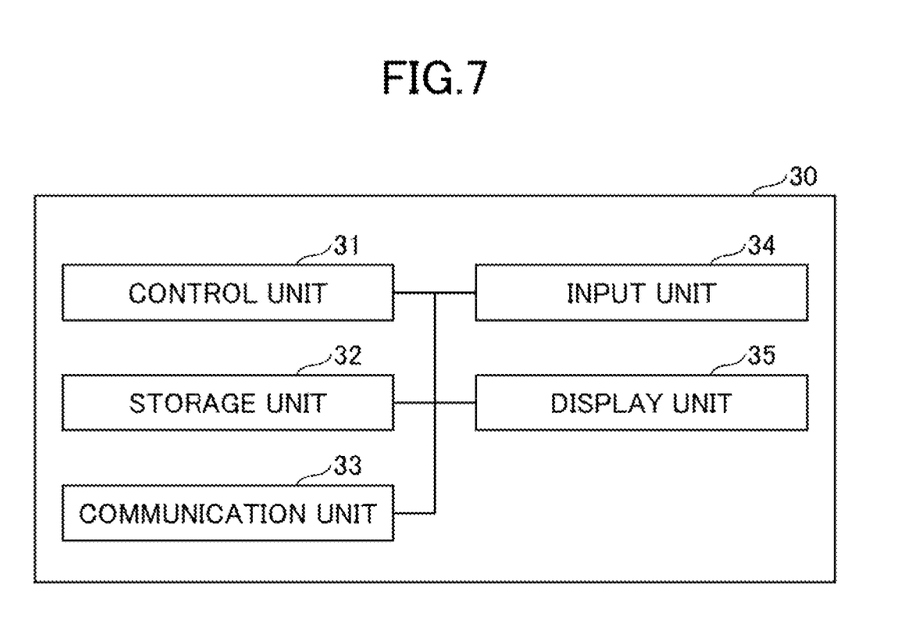
FIG. 7 is a diagram illustrating a functional configuration of a terminal device according to the embodiment.

Next, the functional configuration of the terminal device 30 will be described with reference to FIG. 7. FIG. 7 is a diagram illustrating an example of the functional configuration of the terminal device 30 according to the embodiment. The terminal device 30 includes a control unit 31, a storage unit 32, a communication unit 33, an input unit 34, and a display unit 35.

The control unit 31 transmits and receives data between the units, and controls the entire terminal device 30. The control unit 31 is implemented by the CPU 121 executing a program stored in a predetermined area in the memory 122.

The storage unit 32 is connected to the control unit 31 via a bus, to execute processes of referring to, reading, and rewriting stored data, in response to a command from the control unit 31. The storage unit 32 may also be implemented by, for example, a flash memory, a hard disk, or the like.

The communication unit 33 communicates with the server 10 through the network N. The communication unit 33 includes a function as a receiver for receiving various items of data transmitted from the server 10, and a function as a transmitter for transmitting various items of data to the server 10 in response to a command from the control unit 31.

The communication unit 13 is implemented by, for example, a NIC (Network Interface Card).

The input unit 34 is used by the player to perform various operations (such as game operations), and implemented by, for example, operation buttons, a touch panel, and the like. The display unit 35 is provided for displaying a game screen in response to a command from the control unit 31, and implemented by, for example, a liquid crystal display (LCD). The display unit 35 displays a web page of a game screen generated by the server 10 and received by the communication unit 33, on the screen of the terminal device 30.

Operations of Battle Game and Virtual Camera

Next, a battle game provided by the game system 1 will be outlined briefly. The game system 1 provides an on-line game in which a battle game is played with multiple terminal devices 30 connected to the server 10, separated as enemies and friends.

In the game system 1, a player owns one character (player character) and can play the battle game using the player character owned by himself/herself. The game execution processing unit 14 determines the enemy characters as the opponent of the player character and the friend characters who support the player character, and based on parameters (the physical strength, offensive power, and defensive power) set for each character, determines the winners and the losers of the battle between these characters. In the case of winning the battle against the enemy characters, items owned by the enemy characters and/or the enemy characters themselves are given to the player.

A user other than the player can display the entire battle game on the terminal device 30 of the user, to watch the game. In this way, the user can look over moves of enemy characters present outside the surroundings of the player character, to watch the game. In this way, it is easy to grasp the entire game. Also, it is possible to display the entire battle game on the terminal device 30, which functions as a map.

First Embodiment

Figure 8:
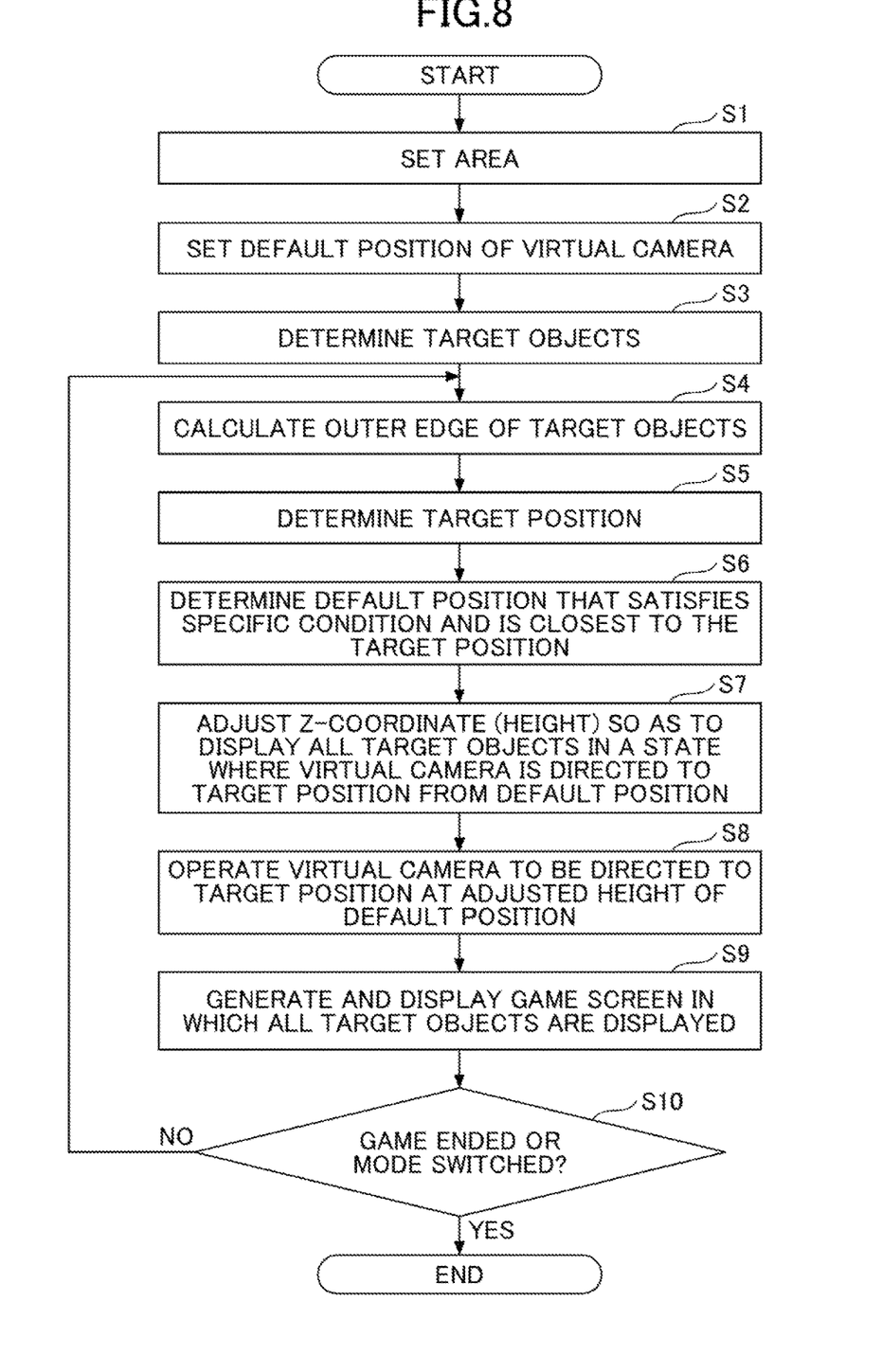
FIG. 8 is a flow chart illustrating camera operations according to a first embodiment.
Figure 9A:
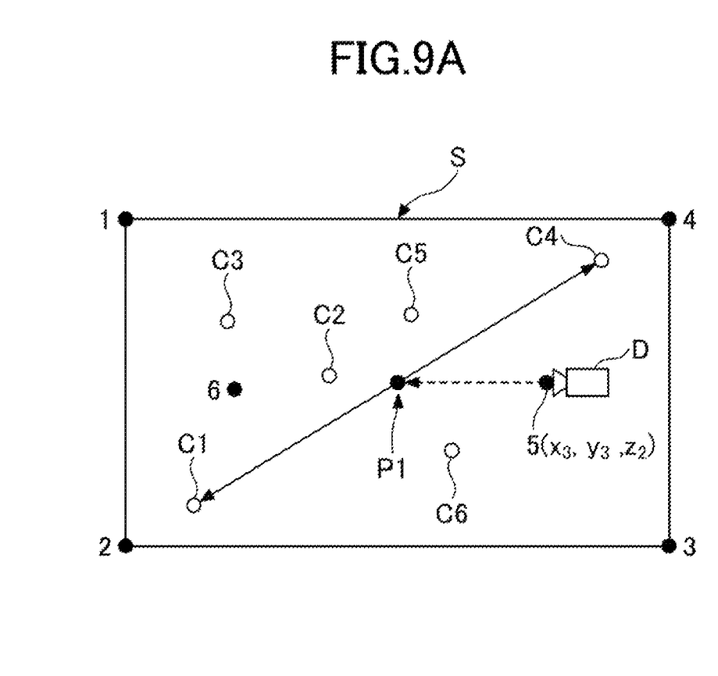
FIGS. 9A-9B are diagrams illustrating camera operations according to the first embodiment.
Figure 9B:
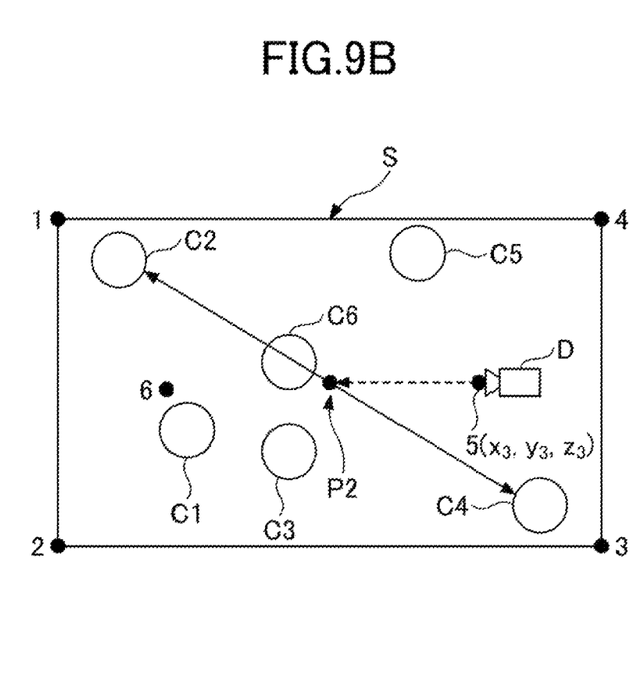
Figure 10A:
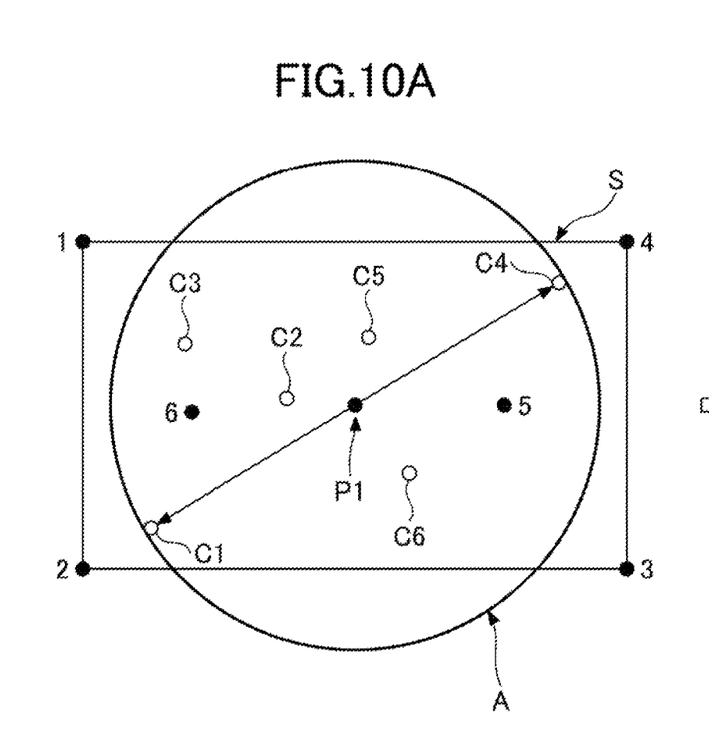
FIGS. 10A-10B are diagrams illustrating an example of a method of determining an outer edge of multiple objects on a stage according to the embodiment.
Figure 10B:
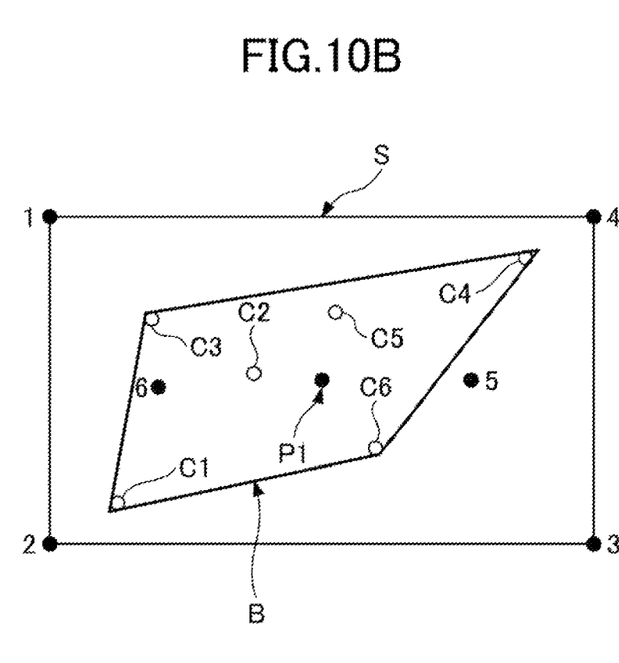

In the following, operations of the virtual camera according to a first embodiment executed during the game processing of a battle game will be described with reference to FIGS. 8 to 10. FIG. 8 is a flow chart illustrating camera operations according to a first embodiment. FIGS. 9A-9B are diagrams illustrating camera operations according to the first embodiment. FIGS. 10A-10B are diagrams illustrating an example of a method of determining the outer edge of multiple objects on a stage according to the embodiment.

In response to a request for distribution of various items of information related to a battle game (a game program, a game screen, etc.) from the terminal device 30 to the server 10, the server 10 starts providing the game contents to the terminal device 30. The process illustrated in FIG. 8 is started when the game execution processing unit 14 executes the battle game at this timing.

First, at Step S1, the setting unit 15 sets a given region in the virtual space. In one example of the embodiment, a stage S is set as the given region in the virtual space, and the region to be set may be the entirety or part of a field where the battle game is played. The region to be set may be set automatically, or may be set as a region selected by the player or a user other than the player.

Next, at Step S2, the setting unit 15 sets default positions of the virtual camera based on the camera default position information table 21 (step (a)). In one example of the embodiment, as illustrated in FIGS. 9A and 9B, the setting unit 15 sets the default positions 1 to 4 of the virtual camera at the four corners of the box-shaped stage S, and sets the default positions 5 and 6 of the virtual camera inside the stage S. The coordinates of the default positions 1 to 6 are as listed in FIG. 5 as the coordinates of the default positions 1 to 6. However, the number of default positions of the virtual camera may be one, or greater than or equal to two.

Next, at Step S3 in FIG. 8, the determination unit 16 determines target objects based on the object information table 22. In one example of the embodiment, the determination unit 16 determines characters C1 to C6 arranged in the region on the stage S as the target objects, based on the object information table 22 illustrated in FIG. 6.

Next, at Step S4, the arithmetic unit 17 calculates the outer edge of the characters C1 to C6 (step (b)). From the calculated outer edge, at Step S5, the determination unit 16 determines a target position to be used when capturing an image by the virtual camera (step (c)). For example, the arithmetic unit 17 calculates the distance for each pair among the characters C1 to C6, to calculate the farthest distance among the calculated distances among the characters. Then, the determination unit 16 determines the center point of the farthest distance among the calculated distances among the characters, as the target position.

At this time, as illustrated in FIG. 10A, as the outer edge of the characters C1 to C6, a circle A whose diameter is a distance (a straight line) between the character C1 and the character C4, which is the farthest distance among the calculated distances among the characters, is identified. Therefore, the center of the circle A is determined as the target position P1 to which the virtual camera is to be directed. Then, at Step S6, the determination unit 16 determines a default position of the virtual camera based on the determined target position P1.

The determination unit 16 may determine a default position, for example, that is closest to the determined target position P1 and satisfies a specific condition, as the default position of the virtual camera. In the example in FIG. 9A, as the position that is closest to the target position P1 located at the midpoint between the character C1 and the character C4, and satisfies a specific condition, the default position 5 is determined as the default position of the virtual camera D. However, a default position that satisfies a specific condition for the determined target position P1 may be determined as the default position of the virtual camera.

As examples of the specific condition, a predetermined distance condition; a point located at a certain height or higher or at a certain height or lower; a point around which the density of player characters is low; and a point around which there is no obstacle, may be listed. The specific condition may be one of these conditions or a combination of two or more.

Next, at Step S7 in FIG. 8, the adjustment unit 18 adjusts the z coordinate (height) of the virtual camera at the default position, so as to display all of the target objects when the virtual camera is directed from the default position to the target position (step (d)). For example, in the case where not all of the target objects are displayed at the height of the initial value z1 of the z coordinate, the adjustment unit 18 raises the z coordinate to place the virtual camera at a position higher than the initial value.

For example, in the example in FIG. 9A, the adjustment unit 18 raises the z coordinate at the default position 5 from the initial value z1 to z2 to place the virtual camera D at a higher position at the default position 5, so as to capture images toward the target position P1, to an extent that the most distant characters C1 and C4 are displayed. In this way, it is possible to look over all of the characters C1 to C6 and to display them as a whole.

After that, as illustrated in FIG. 9B, as the characters C1 to C6 move on the stage S, the adjustment unit 18 calculates again the distance between each pair among the characters C1 to C6. As a result, in the example in FIG. 9B, the distance between the character C2 and the character C4 is determined as the farthest, and the midpoint between the character C2 and the character C4 is determined as the latest target position P2. Also, the default position 5 that is closest to the target position P2 and satisfies the specific condition, is determined as the default position of the virtual camera D.

In the case where all of the target objects are displayed at the initial value z1, the arithmetic unit 17 lowers the z-coordinate to a position at which all of the target objects are displayed and the target objects are displayed to be the largest, to place the virtual camera at a position lower than the initial value.

For example, in FIG. 9B, the adjustment unit 18 lowers the z coordinate at the default position 5 from the initial value z1 to z3 to an extent that the most distant characters C2 and C4 are displayed, to place the virtual camera D at a lower position at the default position 5, and to capture images toward the target position P2. In this way, it is possible to look over all of the characters C1 to C6 and to display them as a whole while making them displayed larger.

Next, at Step S8 in FIG. 8, the camera operation unit 19 operates the virtual camera to be directed to the target position from the adjusted height of the default position (step (e)). Next, at Step S9, the display unit 20 generates a web page of the game screen on which all of the target objects are displayed, and display the web page on the terminal device 30. In this way, as illustrated in FIGS. 9A and 9B, the virtual camera D can display an image in which all of the characters C1 to C6 as the target objects on the stage S, are looked over from above, on the terminal device 30 of the user. Thus, the user can grasp the movement of the entire game when watching the battle game.

Next, at Step S10, the control unit 11 determines whether a command of the end of the game or the mode switching is received. If it is determined that a command of the end of the game or the mode switching is received, the control unit 11 ends the current process. If it is determined that a command of the end of the game or the mode switching is not received, the control unit 11 returns to Step S4 to repeat the processing at Steps S4 to S9.

Note that the mode can be switched between three modes, which are a first-person viewpoint mode of showing the player character operated by the player; a third-person viewpoint mode of showing the surroundings of the player character; and a looking-over mode of looking over the entire game. The looking-over mode is a display mode in which all of the characters C1 to C6 on the stage S are displayed, and the movement on the stage S can be grasped as a whole, as will be described in an example.

Note that the first-person viewpoint mode is a display mode in which the viewpoint of the virtual camera is the same as that of the player who is playing the game. The third-person viewpoint mode is a display mode in which the viewpoint of the virtual camera is located at a certain distance away from the player character, to show the surroundings of the player character. The mode switching can be operated by the player or a user other than the player.

As described above, according to the operations of the virtual camera in the first embodiment, by looking over the game to display it as a whole, it becomes easier for the user to watch the battle game dynamically, and to grasp all moves of the target characters. Also, moves of the individual target characters change the distances among the target characters all the time. Therefore, control is repeated to calculate the distances among the target characters at predetermined time intervals to determine the midpoint between the farthest two characters as the target position, so as to determine the default position based on the target position, and to move the virtual camera by switching its position among the multiple default positions. In this way, the user can dynamically watch moves of all the characters on the stage S without performing any operation.

Second Embodiment

Figure 11:
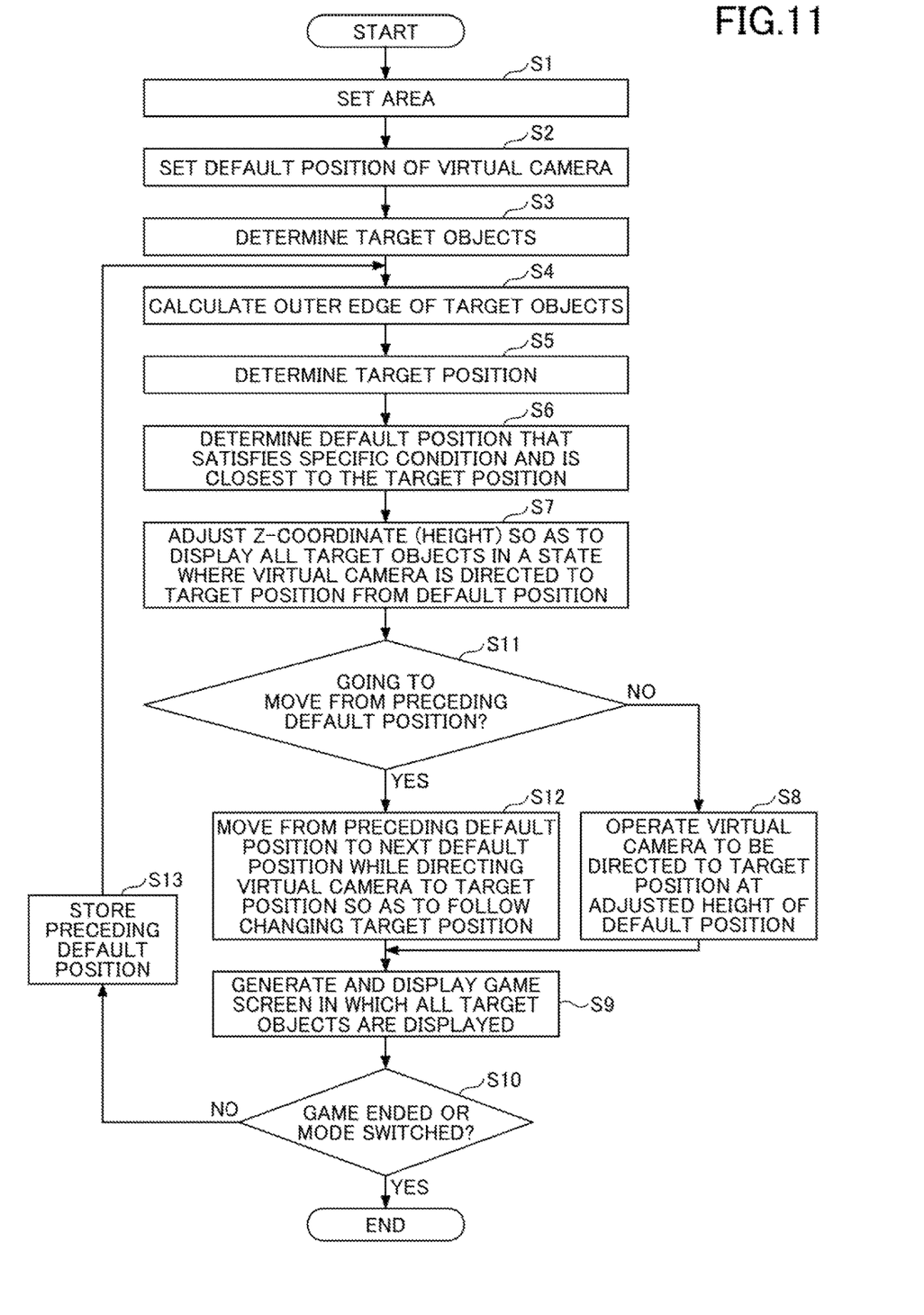
FIG. 11 is a flow chart illustrating camera operations according to a second embodiment.

In the following, operations of the virtual camera according to a second embodiment executed during the game processing of a battle game will be described with reference to FIGS. 11 and 12. FIG. 11 is a flow chart illustrating camera operations according to the second embodiment. FIGS. 12A-12B are diagrams illustrating camera operations according to the second embodiment. In the process illustrated in FIG. 11, the steps executing the same as in the game processing illustrated in FIG. 8 are assigned the same step numbers, to omit or simplify the description of these steps assigned the same step numbers.

For example, the processing at Step S1 to Step S7 is the same as that at Step S1 to Step S7 in FIG. 8 according to the first embodiment; therefore, the description of these steps are omitted here. In the second embodiment, after processing Steps S1 to S7, at Step S11, the camera operation unit 19 determines whether the virtual camera has moved from the preceding default position. If it is determined that the virtual camera has not moved from the preceding default position or there is no preceding default position (i.e., the initial operation of the virtual camera), the camera operation unit 19 proceeds to Step S8 to operate the virtual camera from the default position at the adjusted height toward the target position (step (e)). Next, at Step S9, the display unit 20 generates a web page of the game screen on which all of the target objects are displayed, and display the web page on the terminal device 30. Next, at Step S10, the control unit 11 determines whether a command of the end of the game or the mode switching is received. If it is determined that a command of the end of the game or the mode switching is received, the control unit 11 ends the current process. If it is determined that a command of the end of the game or the mode switching is not received, the control unit 11 stores the preceding default position at Step S13, returns to Step S4, and repeats the processing at Steps S4 to S7, Step S11, Step S12, Steps S8 to S10, and Step S13.

On the other hand, if it is determined at Step S11 that the virtual camera has moved from the preceding default position, at Step S12, the camera operation unit 19 moves the virtual camera from the preceding default position to the next new default position, while directing the virtual camera to the target position so as to follow the changing target position. Next, the processing at Step S9 and Step S10 is executed. If it is determined that a command of the end of the game or the mode switching is received, the control unit 11 ends the current process.

As described above, according to the game processing including the operations of the virtual camera according to the second embodiment, by looking over the game to display it as a whole, it becomes easier for the user to watch the battle game dynamically. Also, moves of the individual target characters change the distances among the target characters all the time. Therefore, control is repeated to calculate the distances among the target characters at predetermined time intervals to determine the midpoint between the farthest two characters as the target position, so as to determine the default position based on the target position. Then, while directing the virtual camera to the target position so as to follow the changing target position, the virtual camera is moved from the preceding default position to the newly determined default position. In this way, when the default position to place the virtual camera changes, the virtual camera moves smoothly while watching the target position, and thereby, it is possible to move the virtual camera more smoothly, and the user can watch the battle game more dynamically. Note that the moving speed of the virtual camera may be constant or variable.

Figure 12A:
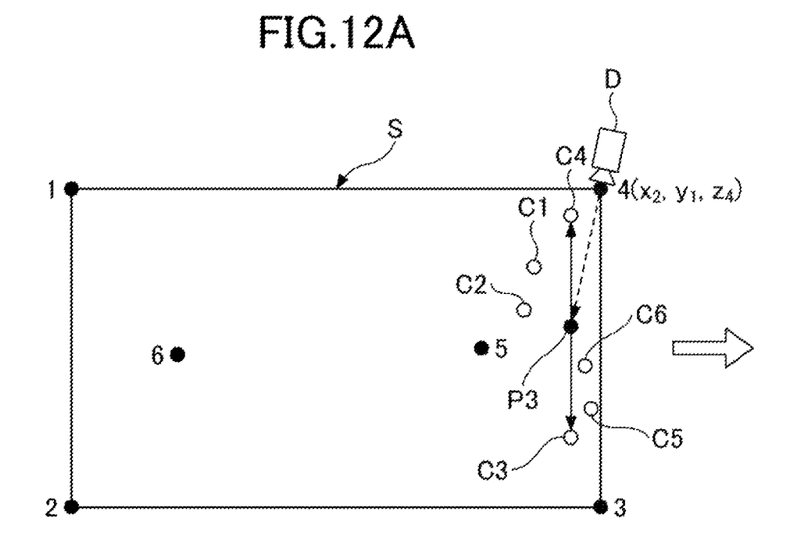
FIGS. 12A-12B are diagrams illustrating camera operations according to the second embodiment.
Figure 12B:
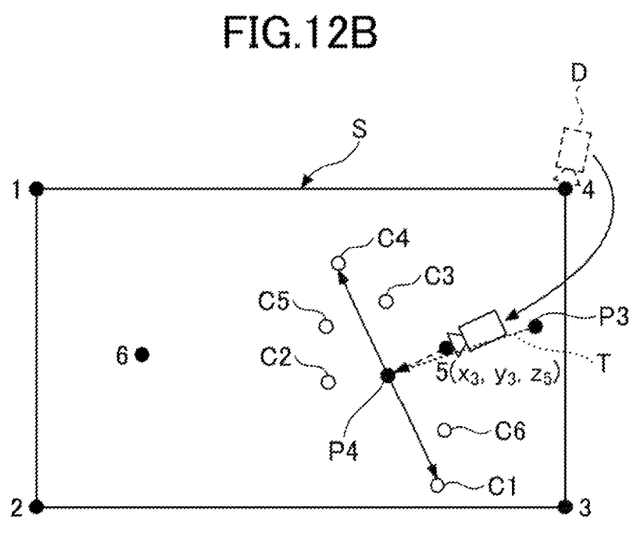

In the example in FIG. 12A, the virtual camera D in a state of being placed at the coordinates (x2, y1, z4) of the default position 4, is directed to the target position P3 to capture images on the stage so as to display all of the characters C1 to C6.

Next, by repeating Steps S4 to S7, the target position and the default position that is closest to the target position and satisfies the specific condition are determined. In this case, while directing the virtual camera to the target position so as to follow the changing target position, the camera operation unit 19 moves from the preceding default position to the next new default position. At this time, suppose the characters have moved to change to the state from FIG. 12A to FIG. 12B. The camera operation unit 19 moves the virtual camera D from the preceding default position 4 to the newly determined default position 5, while directing the virtual camera D in the direction in which the target position changes from P3 to P4 so as to follow the change in target position P3 to P4. In the example in FIG. 12B, moves the virtual camera D rom the default position 4 to the default position 5 while controlling the direction of the virtual camera D to follow a trajectory T that changes from the target position P3 to the target position P4.

As described above, according to the operations of the virtual camera according to the second embodiment, by looking over the game to display it as a whole, it becomes easier for the user to watch the battle game dynamically, and to grasp all moves of the target characters. Also, by moving the virtual camera smoothly from the preceding default position to the next default position while directing the virtual camera to the target position so as to follow the change in the target position, it is possible to display realistic actions of the characters on the stage S, and to enjoy game watching.

In the first and second embodiments, at Step S6, although the default position is determined to be closest to the target position and to satisfy the specific condition so as to place the virtual camera at the determined default position, it is not limited as such. Depending on the distances between the target position and multiple default positions, a default position that is second, third, or fourth closest to the target position may be determined to place the virtual camera at this determined default position.

The game programs, game processing methods and information processing devices according to the embodiments disclosed in the present specification should be considered exemplary in all respects and not restrictive. The embodiments described above can be modified and improved in various forms without departing from the scope and gist of the appended claims. The matters described in the above embodiments may have other configurations within a consistent range, and may be combined within a consistent range.

For example, the method of calculating the outer edge of multiple objects placed on the stage is not limited to the method of setting as the outer edge a circle A that has a diameter being a line segment connecting the farthest two objects as illustrated in FIG. 10A. For example, as illustrated in FIG. 10B, among multiple objects, a polygon B connecting some of the objects positioned relatively outward may be set as the outer edge, to set the target position P1 as the center of gravity of the polygon B, or the intersection point of lines connecting the vertices of the polygon B.

Figure 13:
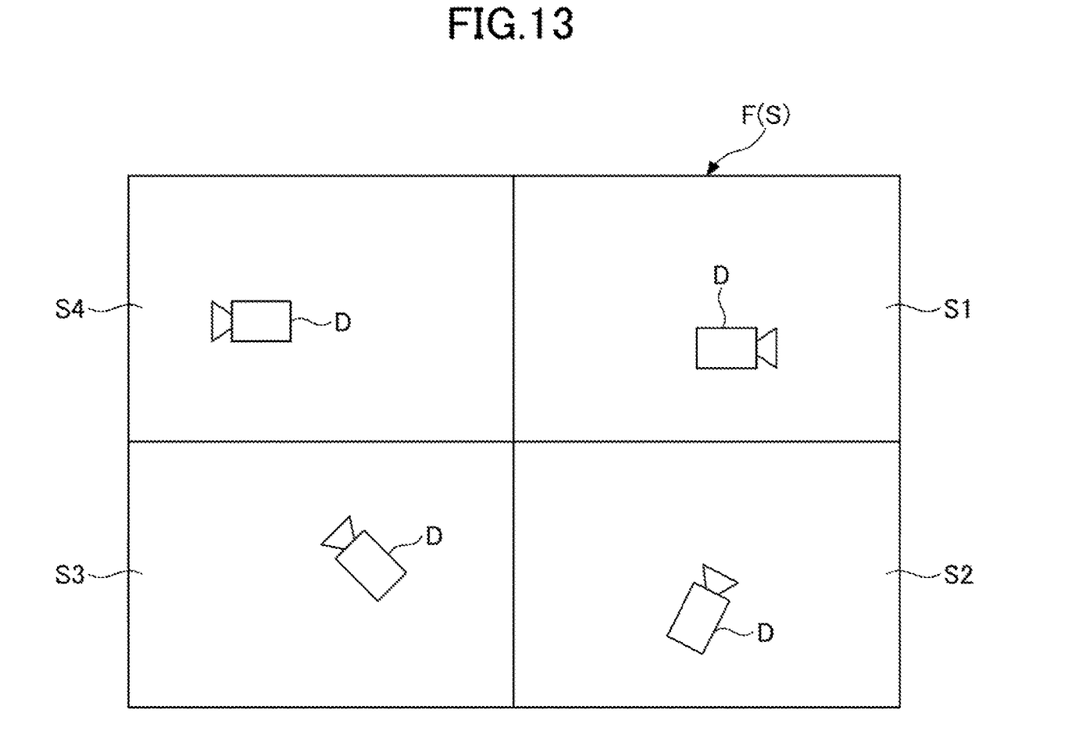
FIG. 13 is a diagram illustrating an example of a given region according to the embodiment.

Also, as illustrated in FIG. 13, the entire field F in which the game is played may be set as the stage S in the virtual space, or part of the field F (S1 to S4) may be set as the stage S in the virtual space.

Also, the stage S in the virtual space may be a region among partitioned regions (S1 to S4) of the field F where the game is played, that satisfies a desired condition. For example, in the case where there are a number of characters in the field F (e.g., 50 friend characters, 50 enemy characters, etc.), the field may be divided into regions (S1 to S4) to place a virtual camera D in each of regions, and in a region where a desired condition is satisfied, operations of the virtual camera D placed in the region may be executed according to one of the embodiments. As an example of the desired condition, the number of characters present in the region becoming less than or equal to a predetermined number (e.g., 20).

Also, the operations by the virtual camera according to the embodiment can also be used for displaying a map in a game other than battle games. For example, in a map of a city planning game, the operations of the virtual camera may be controlled so as to display all building objects.

All examples and conditional language recited herein are intended for pedagogical purposes to aid the reader in understanding the present inventive concept contributed by the inventor to furthering the art, and are to be construed as being without limitation to such specifically recited examples and conditions, nor does the organization of such examples in the specification relate to a showing of the superiority and inferiority of the present inventive concept. Although the embodiments of the present invention have been described in detail, it should be understood that the various changes, substitutions, and alterations could be made hereto without departing from the spirit and scope of the present inventive concept.

What is claimed is:

1. A non-transitory computer-readable recording medium having computer-readable instructions stored thereon, which when executed, causes a computer to execute a process of a game program, the process comprising:
   setting a default position of a virtual camera;
   calculating an outer edge of a plurality of objects arranged in a given region in the virtual space;
   determining a target position in an interior of the outer edge, to which the virtual camera is directed;
   adjusting a height of the virtual camera at the default position so as to display all of the plurality of objects in the region when the virtual camera is directed from the default position to the target position; and
   operating the virtual camera to be directed to the target position from the adjusted height of the default position, wherein the calculating sets, as the outer edge, a circle having a diameter formed by a distance between two objects at a farthest distance among the plurality of objects, or a polygon that connects some of the plurality of objects positioned outward among the plurality of objects, and wherein the determining sets a center of the circle, a center of gravity of the polygon, or an intersection point of lines connecting vertices of the polygon, as the target position.

2. The non-transitory computer-readable recording medium as claimed in claim 1, repeating the calculating, the determining, the adjusting, and the operating.

3. The non-transitory computer-readable recording medium as claimed in claim 2, wherein the setting sets default positions of a plurality of virtual cameras, and wherein the operating changes the position where the virtual camera is placed from one default position to another default position while directing the virtual camera to follow the changing target position.

4. The non-transitory computer-readable recording medium as claimed in claim 3, wherein the operating changes a position at which the virtual camera is placed from one of the default positions to another of the default positions, depending on distances between the target position and default positions of the plurality of virtual cameras.

5. The non-transitory computer-readable recording medium as claimed in claim 2, wherein the operating moves the virtual camera while directing the virtual camera in a changing direction of the target position.

6. The non-transitory computer-readable recording medium as claimed in claim 1, wherein the given region in the virtual space is entirety or part of a field where the game is played.

7. The non-transitory computer-readable recording medium as claimed in claim 1, wherein the given region in the virtual space is a region among partitioned regions of a field where the game is played that satisfies a desired condition.

8. A game processing method executed by a computer, the method comprising:

setting a default position of a virtual camera;

calculating an outer edge of the plurality of objects arranged in a given region in the virtual space;

determining a target position in an interior of the outer edge, to which the virtual camera is directed;

adjusting a height of the virtual camera at the default position so as to display all of the plurality of objects in the region when the virtual camera is directed from the default position to the target position; and operating the virtual camera to be directed to the target position from the adjusted height of the default position, wherein the calculating sets, as the outer edge, a circle having a diameter formed by a distance between two objects at a farthest distance among the plurality of objects, or a polygon that connects some of the plurality of objects positioned outward among the plurality of objects, and wherein the determining sets a center of the circle, a center of gravity of the polygon, or an intersection point of lines connecting vertices of the polygon, as the target position.

9. An information processing device comprising:

a memory; and a processor configured to execute:

setting a default position of a virtual camera;

calculating an outer edge of the plurality of objects arranged in a given region in the virtual space;

determining a target position in an interior of the outer edge, to which the virtual camera is directed;

adjusting a height of the virtual camera at the default position so as to display all of the plurality of objects in the region when the virtual camera is directed from the default position to the target position; and operating the virtual camera to be directed to the target position from the adjusted height of the default position, wherein the calculating sets, as the outer edge, a circle having a diameter formed by a distance between two objects at a farthest distance among the plurality of objects, or a polygon that connects some of the plurality of objects positioned outward among the plurality of objects, and wherein the determining sets a center of the circle, a center of gravity of the polygon, or an intersection point of lines connecting vertices of the polygon, as the target position.

* * * * *